(12) United States Patent
Lee

(10) Patent No.: US 9,977,923 B2
(45) Date of Patent: May 22, 2018

(54) PIN-PAD AND SECURITY METHOD THEREOF

(71) Applicant: WOOSIM SYSTEM INC., Seoul (KR)

(72) Inventor: Il Bok Lee, Gyeonggi-do (KR)

(73) Assignee: WOOSIM SYSTEMS INC., Seoul (KR)

( * ) Notice: Subject to any disclaimer, the term of this patent is extended or adjusted under 35 U.S.C. 154(b) by 91 days.

(21) Appl. No.: 14/917,575

(22) PCT Filed: Jul. 17, 2014

(86) PCT No.: PCT/KR2014/006481
§ 371 (c)(1),
(2) Date: Mar. 8, 2016

(87) PCT Pub. No.: WO2015/037822
PCT Pub. Date: Mar. 19, 2015

(65) Prior Publication Data
US 2016/0224807 A1    Aug. 4, 2016

(30) Foreign Application Priority Data

Sep. 11, 2013  (KR) .......................... 10-2013-0109024

(51) Int. Cl.
*G06F 21/83* (2013.01)
*G06F 3/02* (2006.01)

(52) U.S. Cl.
CPC ............ *G06F 21/83* (2013.01); *G06F 3/0219* (2013.01)

(58) Field of Classification Search
CPC ....................................................... G06F 21/83
See application file for complete search history.

(56) References Cited

U.S. PATENT DOCUMENTS

| | | | |
|---|---|---|---|
| 6,184,713 B1 * | 2/2001 | Agrawal ............ | H03K 19/1737 326/38 |
| 6,572,780 B2 * | 6/2003 | McCormack .......... | B32B 37/26 156/155 |
| 2007/0016963 A1 * | 1/2007 | Robinson ................ | G06F 21/86 726/34 |
| 2012/0002313 A1 * | 1/2012 | Miyabe .................. | G06K 7/084 360/2 |

FOREIGN PATENT DOCUMENTS

| | | | | |
|---|---|---|---|---|
| JP | 2004-252656 A | | 9/2004 | |
| JP | 2008176390 A | * | 7/2008 | ............. G06F 12/14 |

(Continued)

OTHER PUBLICATIONS

Japanese Patent Abstract (in English) of JP Pub. No. 2004-252656 A, Pub. Date Sep. 9, 2004, downloaded on May 31, 2016 from https://www4.j-platpat.inpit.go.jp/.
Japanese Patent Abstract (in English) of JP Pub. No. 2012-114019 A, Pub. Date Jun. 14, 2012, downloaded on May 31, 2016 from https://www4.j-platpat.inpit.go.jp/.
Korean Patent Abstract (in English) of KR Pub. No. 10-2008-0105500 A, Pub. Date Dec. 4, 2008, downloaded on May 31, 2016 from http://kpa.kipris.or.kr.

(Continued)

*Primary Examiner* — Josnel Jeudy
(74) *Attorney, Agent, or Firm* — Barcelo, Harrison & Walker, LLP

(57) ABSTRACT

A pin-pad and pin-pad security method are provided. The pin-pad includes: a keypad module including a plurality of buttons; a main board comprising an encryption circuit configured to encrypt a key signal input from the keypad module; a first flexible circuit board to protect an upper portion of the main board; a second flexible circuit board to surround a side surface of the main board; a double cover to block access to a circuit in the main board; and an information blocking circuit unit configured to erase information stored therein to block leakage of the information when disconnection or a short-circuit of an electric circuit is detected from at least one of the main board and the first and second flexible circuit boards. When the pin-pad is disassembled or cut, information stored in an internal memory is erased to block leakage of the information remaining in the internal memory.

4 Claims, 11 Drawing Sheets

(56) References Cited

FOREIGN PATENT DOCUMENTS

| | | |
|---|---|---|
| JP | 2012-114019 A | 6/2012 |
| KR | 20-0374284 Y1 | 5/2005 |
| KR | 10-2006-0046933 A | 5/2006 |
| KR | 10-2008-0105500 A | 12/2008 |
| KR | 10-2011-0134080 A | 12/2011 |
| KR | 10-2013-0024394 A | 3/2013 |
| KR | 10-2013-0078499 A | 7/2013 |

OTHER PUBLICATIONS

Korean Patent Abstract (in English) of KR Pat. No. 20-0374284, Registration Date Jan. 17, 2005.
Korean Patent Abstract (in English) of KR Pub. No. 10-2006-0046933 A, Pub. Date May 18, 2006, downloaded on Sep. 27, 2016 from http://kpa.kipris.or.kr/.
Korean Patent Abstract (in English) of KR Pub. No. 10-2011-0134080 A, Pub. Date Dec. 14, 2011, downloaded on Sep. 27, 2016 from http://kpa.kipris.or.kr/.
Korean Patent Abstract (in English) of KR Pub. No. 10-2013-0024394 A, Pub. Date Mar. 8, 2013, downloaded on Sep. 27, 2016 from http://kpa.kipris.or.kr/.
Korean Patent Abstract (in English) of KR Pub. No. 10-2013-0078499 A, Pub. Date Jul. 10, 2013, downloaded on Sep. 27, 2016 from http://kpa.kipris.or.kr/.

\* cited by examiner

PIN-PAD AND SECURITY METHOD THEREOF

CROSS-REFERENCE TO RELATED APPLICATIONS

This application is the national stage for International Patent Cooperation Treaty Application PCT/KR2014/006481, filed Jul. 17, 2014, which claims priority from Korean Patent Application No. 10-2013-0109024, filed on Sep. 11, 2013, in the Korean Intellectual Property Office. The entire contents of said applications are incorporated herein by reference for all purposes.

BACKGROUND

Technical Field

The present invention relates a pin-pad and a security method of the pin-pad, and more particularly, to a pin-pad for blocking external leakage of information stored therein if disassembly or damage of the pin-pad is detected, and a security method of the pin-pad.

Background Art

Generally, a pin-pad is a device for a customer to directly input a password instead of writing the password on a paper, in order to prevent the password written on an application for opening an account, a slip, or the like from leaking while an employee of a finance company is working or discarding the slip. The pin-pad is mostly used as a password input device provided in business branches of a finance company, and as the customer directly inputs a password or the like, a person other than the customer is unable to check the input password, thereby increasing security.

The pin-pad may be provided in an automatic teller machine (ATM), and when a user inputs a password, encrypts and processes the password. Recently, plans to introduce the pin-pad to credit card payment are being discussed, wherein the user directly inputs the password by using the pin-pad during credit card payment, thereby preventing illegal sales when a credit card is lost.

As such, the pin-pad that is used to input the password when security is required is combined with an encryption device for encrypting input data.

However, a person having an unfair intention may try to hack the pin-pad by arbitrarily disassembling or damaging the pin-pad, and thus various types of information, such as the password, stored in a memory of the pin-pad may be leaked.

Accordingly, in order to prevent illegal hacking, security of the pin-pad needs to be reinforced by preventing information stored therein from leaking by erasing the information when disassembly or cutting of the pin-pad is detected.

Technical Problem

One or more embodiments of the present invention provide a pin-pad for blocking information stored therein from externally leaking by erasing the information when disassembly or cutting of the pin-pad is detected, and a security method of the pin-pad.

Technical Solution

According to an aspect of the present invention, there is provided a pin-pad including: a keypad module including a plurality of buttons; a main board in which an encryption circuit configured to encrypt a key signal input from the keypad module is provided; a first flexible circuit board provided to protect an upper portion of the main board by being provided at the upper portion of the main board; a second flexible circuit board provided at a bottom of the main board and provided to surround at least a side surface of the main board as an end portion of the second flexible circuit board is bent; a double cover provided to block access to a circuit provided in the main board; a sub-board electrically connected to the main board by being combined on one surface of the double cover, wherein patterns having different intervals and shapes are formed on an inner layer of the sub-board to detect disconnection or a short-circuit of an electric circuit caused by cutting of at least one portion; a connection pin configured to penetrate through and fix the main board, the first and second flexible circuit boards, and the sub-board; and an information blocking circuit unit configured to erase information stored therein to block leakage of the information when disconnection or a short-circuit of an electric circuit is detected from at least one of the main board, the first and second flexible circuit boards, and the sub-board, wherein a first circuit pattern is formed on front surfaces of the first and second flexible circuit boards, a second circuit pattern having an interval and a thickness smaller than the first circuit pattern is formed on rear surfaces of the first and second flexible circuit boards, and end portions of the first and second flexible circuit boards are bent at least twice in a shape of [ to surround the side surface of the main board.

According to another aspect of the present invention, there is provided a security method of a pin-pad, the security method including: arranging a keypad module including a plurality of buttons, and a main board in which an encryption circuit configured to encrypt a key signal input from the keypad module is provided; arranging a flexible circuit board provided to surround at least a side surface of the main board as an end portion of the flexible circuit board is bent, including a first circuit pattern at a front surface, and including a second circuit pattern having an interval and a thickness smaller than the first circuit pattern at a rear surface; and erasing information stored in the pin-pad to block leakage of the information when disconnection or a short circuit of an electric circuit is detected from at least one of the main board and the flexible circuit board.

Advantageous Effects

According to the present invention, when a part of a flexible circuit board is damaged due to disassembly or cutting or when disconnection of an electric circuit is detected as a connection pin is separated, information stored in an internal memory is erased, thereby preventing the information from leaking. Accordingly, security may be reinforced by preventing the information from leaking via hacking and being illegally used.

DETAILED DESCRIPTION

Best Mode

Hereinafter, one or more embodiments of the present invention will now be described with reference to accompanying drawings.

Figure 1:
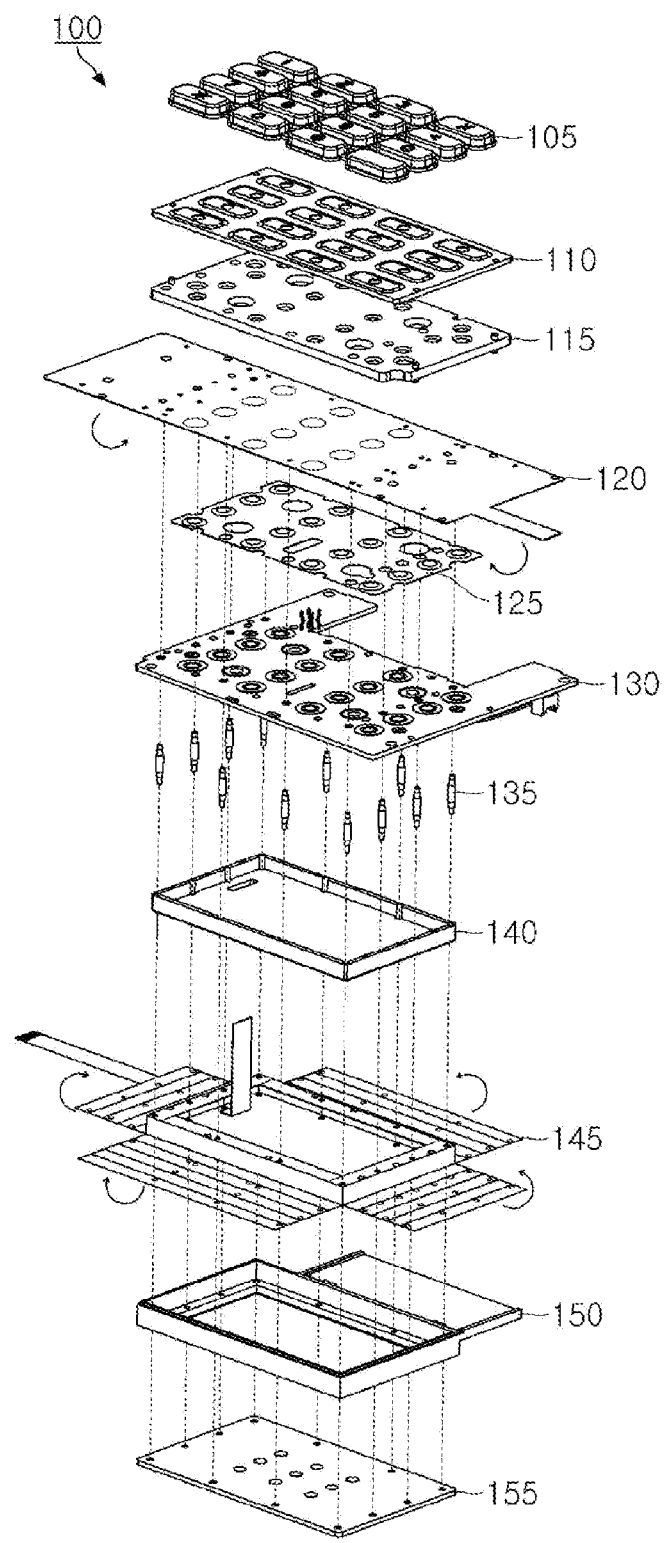
FIG. 1 is an exploded perspective view of a pin-pad according to an embodiment of the present invention.
Figure 2:
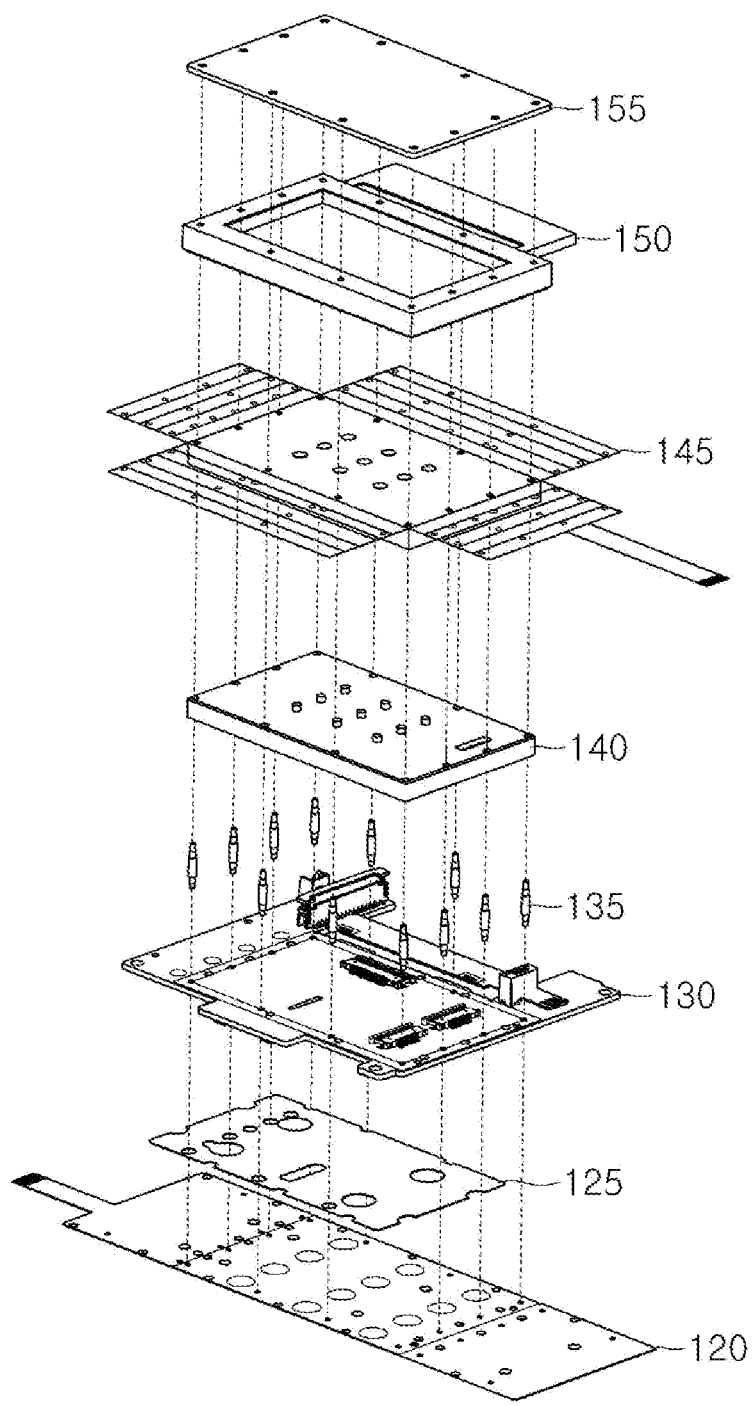
FIG. 2 is an exploded perspective view of the pin pad viewed from another direction, according to an embodiment of the present invention.

FIG. 1 is an exploded perspective view of a pin-pad 100 according to an embodiment of the present invention, and FIG. 2 is an exploded perspective view of the pin pad 100 viewed from another direction, according to an embodiment of the present invention.

Referring to FIGS. 1 and 2, the pin-pad 100 according to the present invention may include a keypad 105, a keypad rubber 110, a keypad guide 115, a first flexible circuit board 120, a dome sheet 125, a main board 130, a connection pin 135, an internal cover 140, a second flexible circuit board 145, an external cover 150, and a sub-board 155.

The keypad 105 includes a plurality of buttons for inputting a number, a symbol, etc. The keypad rubber 110 having a pressurizing protrusion is provided at a bottom surface of the keypad 105. The keypad guide 115 is provided at a bottom surface of the keypad rubber 110. The keypad guide 115 includes a hole corresponding to the pressurizing protrusion of the keypad rubber 110, thereby fixing a location of the keypad rubber 110.

The keypad rubber 110 may pressurize the dome sheet 125 through the hole included in the keypad guide 115 and the first flexible circuit board 120. The dome sheet 125 may include a plurality of metal domes, wherein the metal dome may electrically connect contacts formed on the main board.

The main board 130 includes a plurality of contacts for switching, and includes a memory (not shown) for storing information and a controller (not shown) for erasing the information stored in the memory by detecting disconnection or the like of an electric circuit. The sub-board 155 is electrically connected to the main board 130 and may include additional electronic components.

A plurality of the connection pins 135 combines and electrically connects the first flexible circuit board 120, the main board 130, the second flexible circuit board 145, the sub-board 155, etc.

The keypad 105, the keypad rubber 110, the keypad guide 115, the dome sheet 125, the main board 13, etc. form a keypad module, and the internal cover 140 and the external cover 150 accommodates the keypad module. At this time, the first flexible circuit board 120 and the second flexible circuit board 145 are electrically connected to the keypad module, and are provided to surround at least one surface of the keypad module.

Also, the internal cover 140 and the external cover 150 form a double case, wherein at least one surface of the internal cover 140 is surrounded by the first flexible circuit board 120 and the second flexible circuit board 145. Accordingly, even when the external cover 150 is damaged, an internal circuit may be protected by the internal cover 140, the first flexible circuit board 120, and the second flexible circuit board 145.

According to such a structure, when a circuit is separated as the first and second flexible circuit boards 120 and 145 are partially damaged or when disconnection of a circuit connected through the connection pin 135 is detected, the controller may erase information stored in the memory, thereby blocking leakage of the information stored in the memory.

Figure 3A:
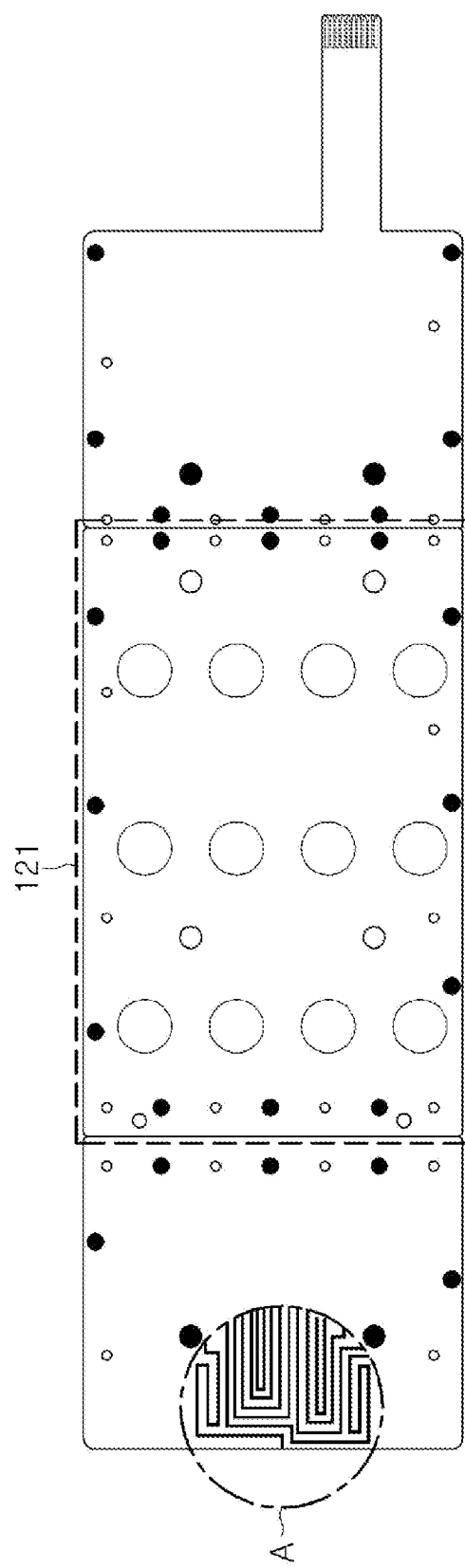
FIGS. 3A and 3B are plan views of a first flexible circuit board of FIG. 1.
Figure 3B:
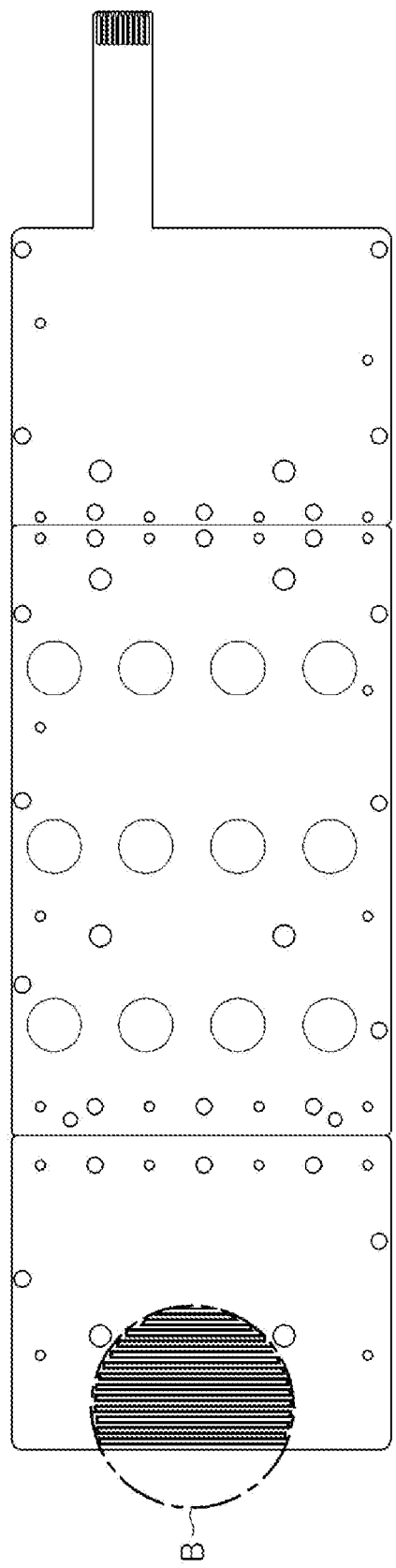

FIGS. 3A and 3B are plan views of the first flexible circuit board 120 of FIG. 1.

Referring to FIGS. 3A and 3B, electronic components may be fixedly provided and electrically connected to each other in the first flexible circuit board 120 to form an electric circuit. Also, the first flexible circuit board 120 may be electrically connected to the main board 130, the second flexible circuit board 145, and the sub-board 155, etc. A plated through-hole for electric connection with the connection pin 135 may be provided in the first flexible circuit board 120.

A center portion 121 of the first flexible circuit board 120 is disposed between the keypad guide 115 and the dome sheet 125, and a peripheral portion that is a remaining portion excluding the center portion 121 is provided to surround at least one surface of the keypad module while the pin-pad 100 is assembled.

Also, relatively wide patterns are connected in a puzzle shape on a front surface of the first flexible circuit board 120 as shown in a region A of FIG. 3A, and fine patterns having intervals of about 0.2 mm are connected on a rear surface of the first flexible circuit board 120 as shown in a region B of FIG. 3B. By forming patterns as such, projection is not possible since the patterns formed on the front and rear surfaces overlap each other, even if an X-ray or another projection apparatus is used.

Figure 4A:
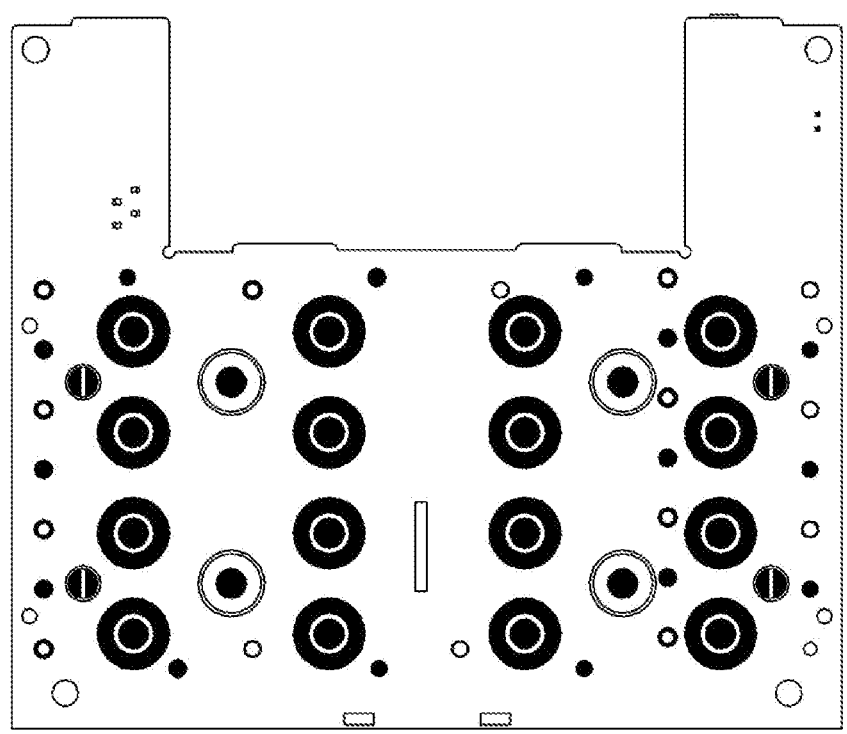
FIGS. 4A and 4B are a plan view and a bottom view of a main board of FIG. 1.
Figure 4B:
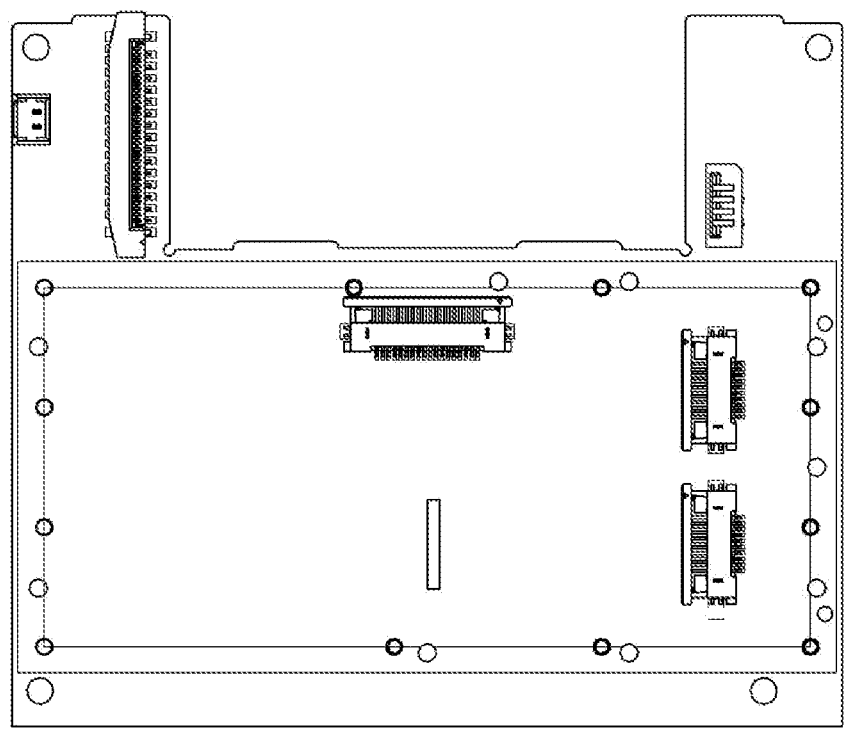

FIGS. 4A and 4B are a plan view and a bottom view of the main board 130 of FIG. 1.

FIG. 4A is a plan view of the main board 130 and FIG. 4B is a bottom view of the main board 130. As shown in FIGS. 4A and 4B, the main board 130 includes a plurality of contacts for switching, and electronic components and connection terminals are provided at a bottom surface of the main board 130. The main board 130 may include the memory for storing information and the controller.

Figure 5:
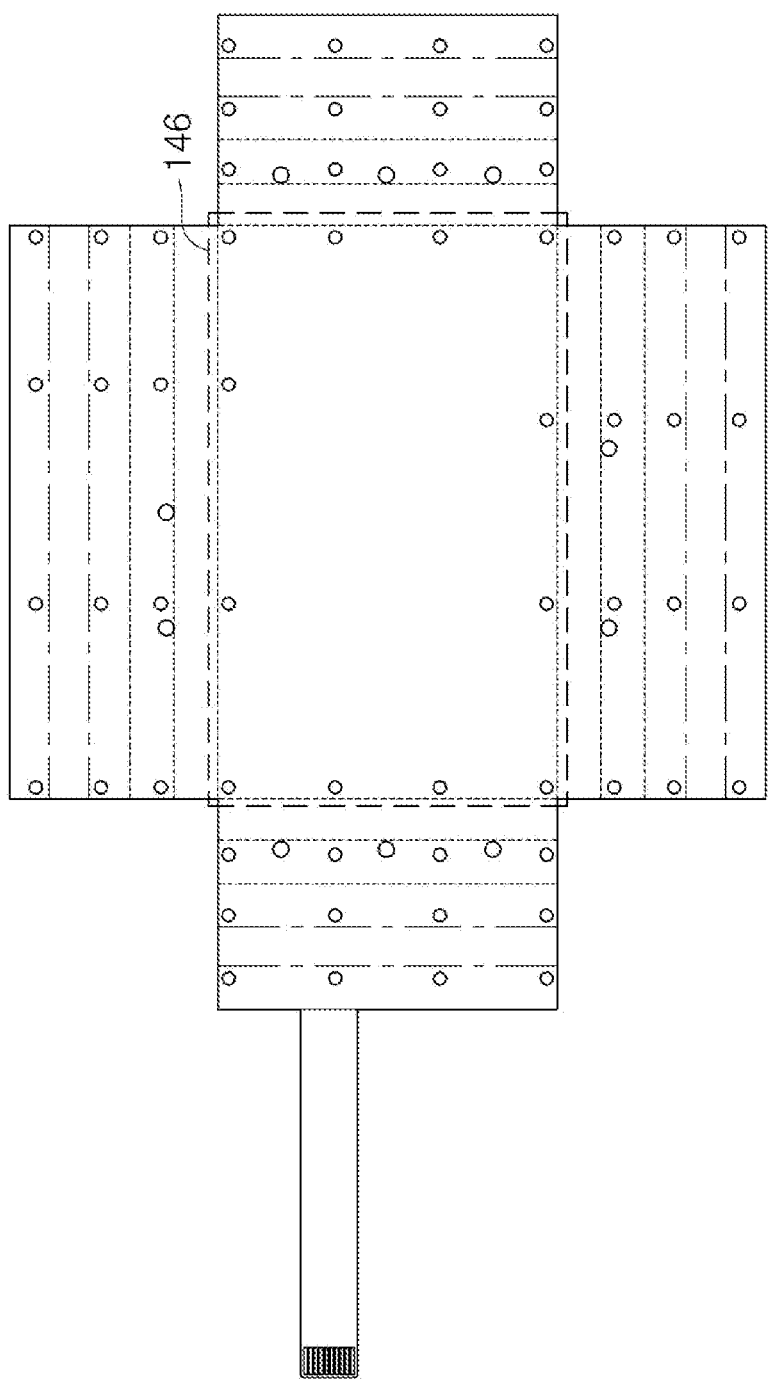
FIG. 5 is a plan view of a second flexible circuit board of FIG. 1.

FIG. 5 is a plan view of the second flexible circuit board 145 of FIG. 1.

Referring to FIG. 5, electronic components may be fixedly provided and electrically connected to each other in the second flexible circuit board 145 to form an electric circuit, and the second flexible circuit board 145 may be electrically connected to the first flexible circuit board 120, the main board 130, and the sub-board 155, etc.

A center portion 146 of the second flexible circuit board 145 is disposed between the internal cover 140 and the sub-board 155, and a peripheral portion that is a remaining portion excluding the center portion 146 is provided to surround at least one surface of the keypad module while the pin-pad 100 is assembled.

Also in the second flexible circuit board 145, different patterns are formed on a front surface and a rear surface like the first flexible circuit board 120 described above, and thus projection is not possible.

Also, since the first and second flexible circuit boards 120 and 145 are provided to surround one surface of the keypad module, considering the patterns formed on the front surfaces and the rear surfaces, total four layers of patterns protect an internal circuit, and thus breaking into the internal circuit is almost impossible.

Figure 6:
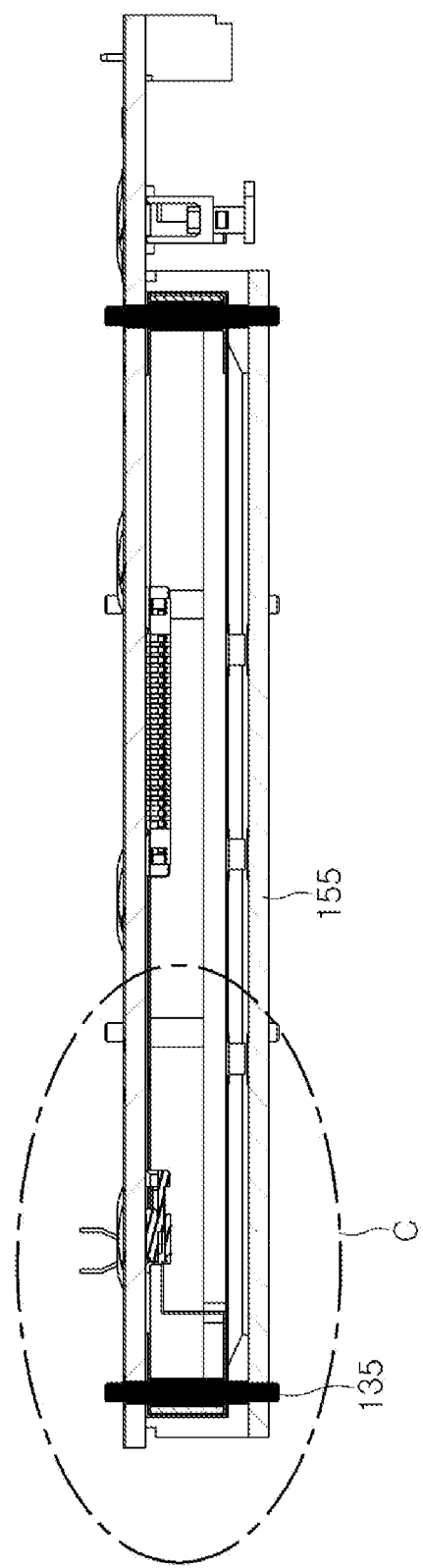
FIG. 6 is a view of a part of a cross-section of a pin pad, according to an embodiment of the present invention.
Figure 7:
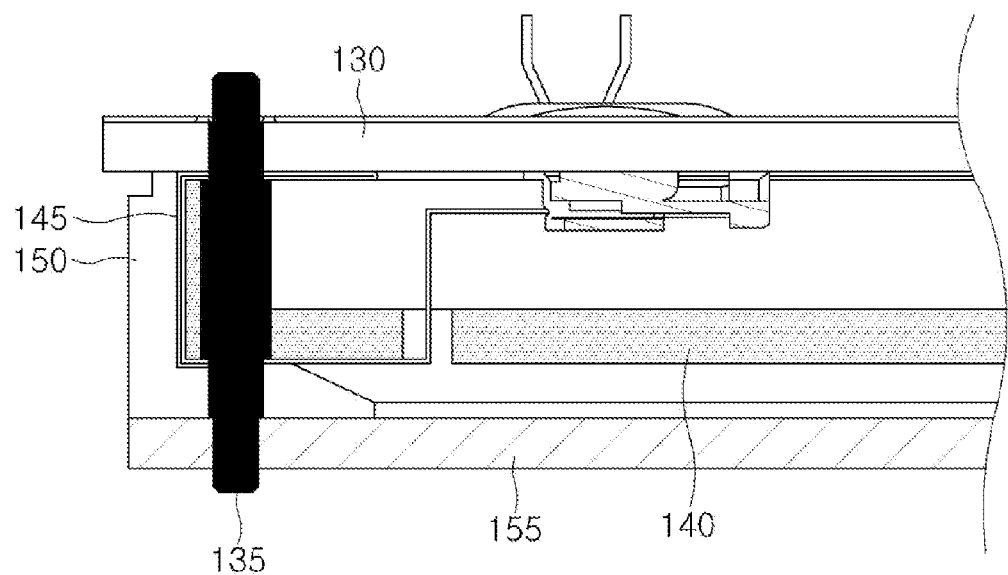
FIG. 7 is an enlarged view of a region C of FIG. 5.

FIG. 6 is a view of a part of a cross-section of the pin pad 100, according to an embodiment of the present invention, and FIG. 7 is an enlarged view of a region C of FIG. 6.

Referring to FIGS. 6 and 7, the center portion 146 of the second flexible circuit board 145 is disposed between the internal cover 140 and the sub-board 155, and the peripheral portion is bent in a shape of " to surround the keypad module. The first flexible circuit board 120 may be provided in a similar manner.

According to such a structure, when there is an attempt to access an internal circuit by cutting a part of the pin-pad 100, a circuit of the first or second flexible circuit board 120 or 145 is electrically disconnected. Also, since a side surface of the connection pin 135 has a stepped structure, the connection pin 135 may have several contacts with the first flexible circuit board 120, the second flexible circuit board 145, the main board 130, and the sub-board 155, etc., or may be only connected to a desired board. Accordingly, when any one of the first flexible circuit board 120, the second flexible circuit board 145, the main board 130, and the sub-board 155 is separated, disconnection of a circuit connected to the connection pin 135 is detected. The connection pin 135 may also fix several boards.

Accordingly, when disconnection of an electric circuit is detected, by erasing information stored in the memory, a leakage of the information could be blocked.

Figure 8:
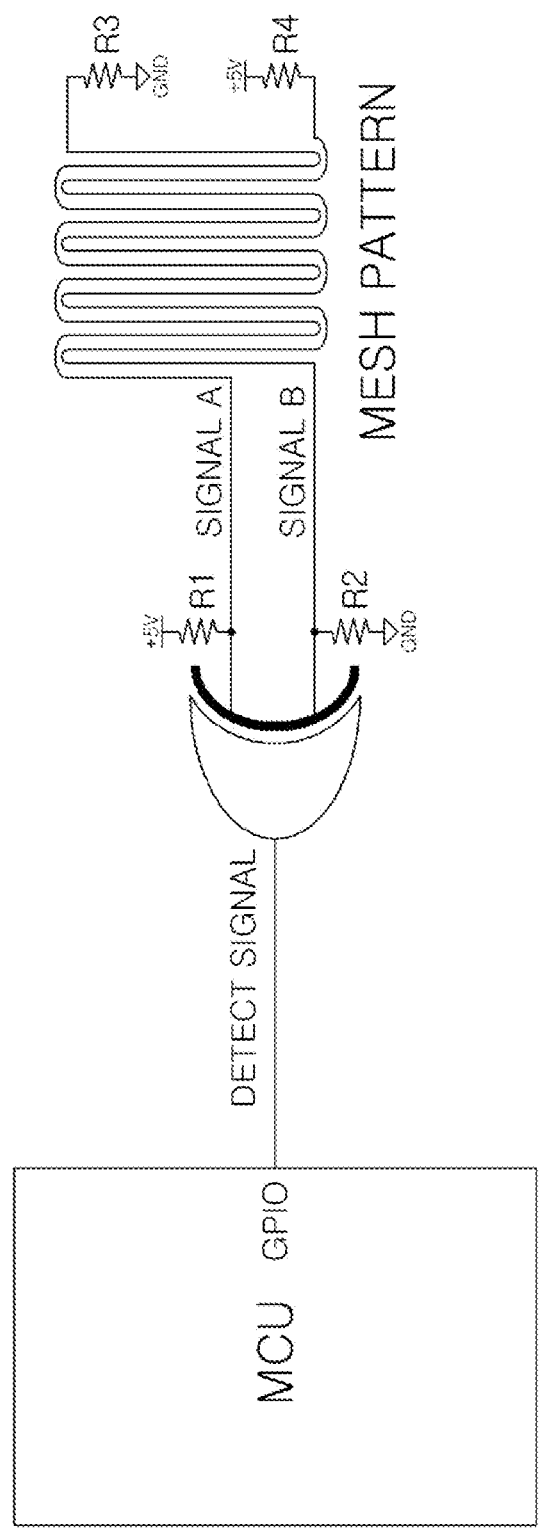
FIG. 8 is a diagram of a structure of an information blocking circuit unit.

FIG. 8 is a circuit diagram of an information blocking circuit unit applicable to the pin-pad 100, according to an embodiment.

The information blocking circuit unit is a circuit that erases information stored in the pin-pad 100 to block leakage of the information when disconnection or a short-circuit of an electric circuit is detected from at least one of the main board 130, the first flexible circuit board 120, the second flexible circuit board 145, and the sub-board 155.

Referring to FIG. 8, mesh patterns of a signal A and a signal B are formed in parallel lines, in which two patterns are approached as much as possible. The mesh patterns may be formed on the main board 130, the first flexible circuit board 120, the second flexible circuit board 145, and the sub-board 155, etc.

The signal A is configured to be logic low (0) and the signal B is configured to be logic high (1) by determining suitable values of pull-up resistors R1 and R4 and pull-down resistors R2 and R3. For example, the pull-up resistor R1 and the pull-down resistor R2 may have a value of 100 K, and the pull-down resistor R3 and the pull-up resistor R4 may have a value of 1 M.

In this case, a detect signal is the exclusive OR of the signals A and B, the detect signal is logic high (1). An MCU is in a normal state, i.e., not invaded, when a GPIO value is high (1), and the pin-pad 100 erases security information when the GPIO value changes.

When the mesh pattern is broken, a value of the signal A is changed from low to high, and thus values of the signals A and B both become high (1) and the detect signal becomes logic low.

Also, when the two patterns are short-circuited by a metal probe, voltages of the signals A and B become the same, and thus the detect signal, i.e., an XOR value of the signals A and B, become logic low (0).

When the detect signal becomes logic low, the GPIO value changes from 1 to 0, and thus MCU detects an invasion. Since the MCU uses only one GPIO pin, the number of MCU pins may be saved.

As described above, not only a broken pattern but also a short-circuit between patterns may be detected.

Figure 9:
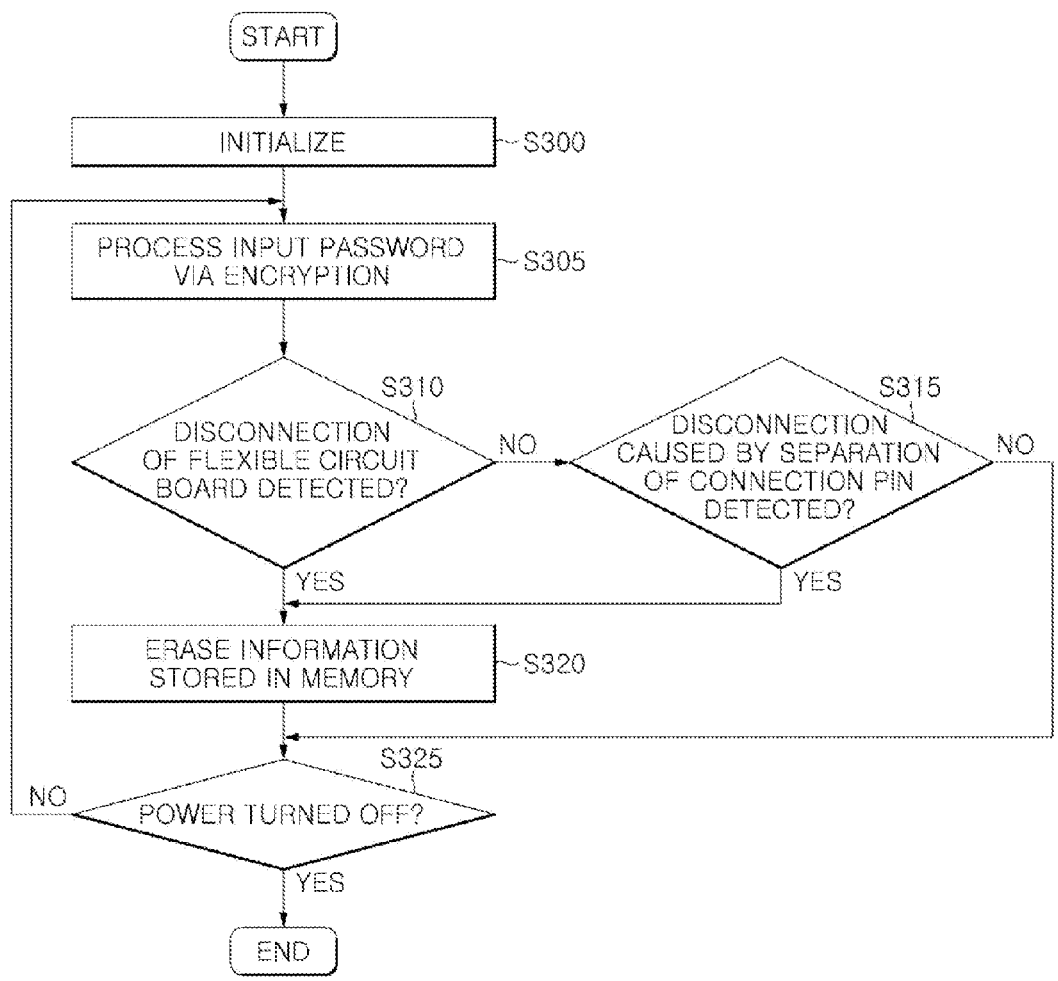
FIG. 9 is a flowchart of a security method of a pin-pad, according to an embodiment of the present invention.

FIG. 9 is a flowchart of a security method of the pin-pad 100, according to an embodiment of the present invention.

Referring to FIG. 9, when power is supplied to the pin-pad 100, an initialization process is performed in operation S300, and after the initialization process is performed, a password or the like input through the buttons included in the keypad 105 is processed via encryption in operation S305.

During such operations, when electric disconnection is detected as a part of the first and second flexible circuit boards 120 and 145 is damaged in operation S310 or when electric disconnection is detected according to separation of the connection pin 135 in operation S315, the controller erases information stored in the memory in operation S320. Accordingly, information stored in an internal memory may be blocked from leaking.

When the electric disconnection is not detected and it is determined that power is not turned off in operation S325, operations after operation S305 are repeatedly performed.

Accordingly, when a part of the first or second flexible circuit board 120 or 145 is damaged due to disassembly or deconstruction of the pin-pad 100 or when disconnection of an electric circuit caused by separation of the connection pin 135 is detected, information stored in the internal memory is discarded to block leakage of the stored information.

Also, the pin-pad and the security method according to the present invention are not limitedly applied to the structures and methods according to the embodiments described above, and some or all of the embodiments may be selectively combined for various modification.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The present invention may be used in a pin-pad into which a password or the like is input under a situation where security is required.

What is claimed is:
1. A pin-pad comprising:
a keypad module comprising a plurality of buttons;
a main board in which an encryption circuit configured to encrypt a key signal input from the keypad module is provided;
a first flexible circuit board provided to protect an upper portion of the main board by being provided at the upper portion of the main board;
a second flexible circuit board provided at a bottom of the main board to protect the bottom portion of the main board and provided to surround at least a side surface of the main board as an end portion of the second flexible circuit board is bent;
a double cover provided to block access to a circuit provided in the main board;
a sub-board electrically connected to the main board by being combined on one surface of the double cover, wherein circuit patterns having different intervals and shapes are formed on an inner layer of the sub-board to detect disconnection or a short-circuit of an electric circuit caused by cutting of at least one portion of the sub-board;

a connection pin configured to penetrate through and fix the main board, the first and second flexible circuit boards, and the sub-board; and an information blocking circuit unit configured to erase information stored therein to block leakage of the information when disconnection or a short-circuit of an electric circuit is detected from at least one of the main board, the first and second flexible circuit boards, and the sub-board, wherein a first circuit pattern is formed on front surfaces of the first and second flexible circuit boards, a second circuit pattern having an interval and a thickness smaller than the first circuit pattern is formed on rear surfaces of the first and second flexible circuit boards, and wherein the first circuit pattern and second circuit pattern are formed to detect disconnection or a short-circuit of an electric circuit caused by cutting of at least one portion of the first flexible circuit or second flexible circuit.

2. The pin-pad of claim 1, wherein the information blocking circuit unit comprises:

a first circuit line connected to a first pull-up resistor and a first pull-down resistor;

a second circuit line connected to a second pull-up resistor and a second pull-down resistor;

an XOR (exclusive-OR) gate comprising an input terminal having one end connected to the first circuit line and the other end connected to the second circuit line; and a controller configured to erase the information stored therein by detecting the disconnection and the short-circuit of the electric circuit, based on an output of the XOR gate.

3. The pin-pad of claim 1, wherein the connection pin electrically connects at least two of the main board, the first and second flexible circuit boards, and the sub-board by using a stepped surface formed at side surfaces of two end portion of the connection pin, and the information blocking circuit unit erases the information stored therein to block leakage of the information when separation of electric connection via the connection pin is detected.

4. The pin-pad of claim 1, wherein the double cover comprises:

a first cover configured to cover at least one region of the main board to block access to a circuit provided in the main board; and a second cover provided inside the first cover to fix a bent shape of the second flexible circuit board and block access to the circuit provided in the main board.

* * * * *